April 14, 1936.  J H. HUNT  2,037,470
VEHICLE WHEEL
Filed Sept. 29, 1932
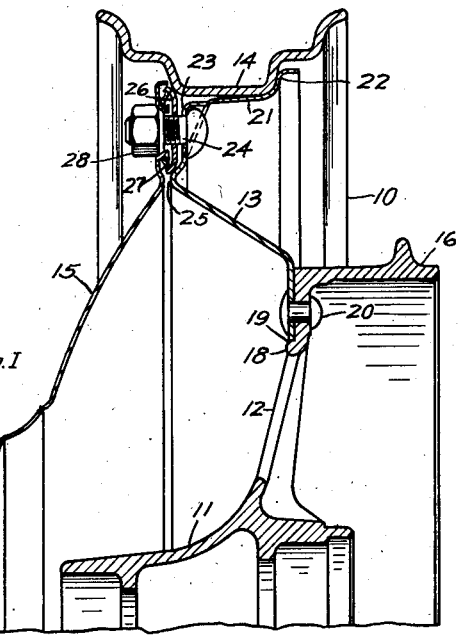
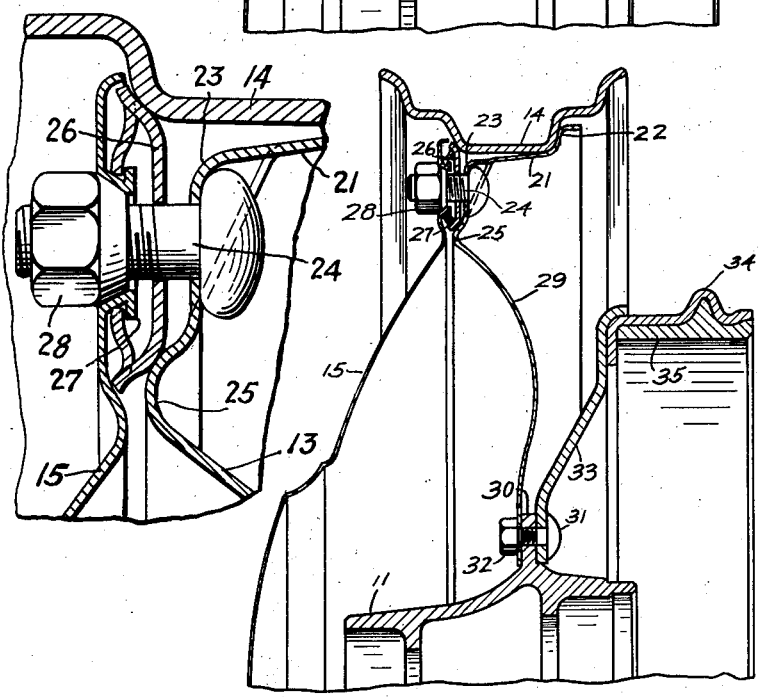
INVENTOR.
J Harold Hunt.
BY Carroll R. Taber
HIS ATTORNEY.

Patented Apr. 14, 1936

2,037,470

UNITED STATES PATENT OFFICE 2,037,470

VEHICLE WHEEL

J Harold Hunt, Lansing, Mich., assignor to Motor Wheel Corporation, Lansing, Mich., a corporation of Michigan Application September 29, 1932, Serial No. 635,310

12 Claims. (Cl. 301—37)

This invention relates to vehicle wheels and more particularly to wheels embodying a removable shield or cover plate.

The principal object of the invention is the provision of a detachable cover plate adapted to be associated with a conventional wheel body whereby to strengthen the same.

Another object is the provision of a wheel body consisting of a conventional disk attached to a wheel hub and a detachable cover plate arranged in spaced relation to the disk whereby the two together form a wheel body of box like construction.

A further object is the provision of a detachable cover plate adapted to be connected to a wheel by the same means utilized for securing a demountable rim to the wheel.

Still another object is the provision of a detachable cover plate which is provided at its periphery with clamping means adapted to be utilized for securing a demountable rim to the wheel.

Other objects more or less incidental and ancillary to the foregoing will appear in the following description taken in connection with the accompanying drawing, in which:

Figure I is a partial sectional view of a vehicle wheel embodying the invention; and Figure II is a partial sectional view of a different wheel embodying the invention.

Figure III is an enlarged section of the clamping lug, clamping bolt and related parts illustrated in Figures I and II.

The vehicle wheel 10 shown in Figure I consists of a conventional hub 11, a brake drum 12 formed integrally with the hub, a wheel supporting disk 13 secured to the brake drum 12, a demountable rim 14 seated upon a peripheral flange of the disk 13, and a disk-like cover plate 15 removably attached to the disk 13 whereby to reinforce the disk and hold the rim 14 in position upon its seat. The brake drum 12 is provided with an axially extending flange 16 which serves as a conventional brake ring. The web portion of the brake drum 12 is provided with an annular shoulder 18 spaced inwardly a short distance from the flanged periphery 16 thereof.

The disk 13 is provided with a central opening therethrough of a suitable size whereby the edge 19 defining this opening may be seated upon the annular shoulder 18. The portion of the disk 13 immediately adjacent the central opening therethrough contacts the peripheral portion of the brake drum web 12 and is secured thereto preferably by the rivets 20. It should of course be understood that any other suitable securing means such as welding, for example, may be utilized if desired. The disk 13 is provided with a peripheral flange 21 adapted to form a seat for the demountable rim 14 which, as shown here, is of the drop center type. The flange 21 is provided with a shoulder 22 at one edge thereof against which the well portion of the rim 14 is positioned and by means of which the rim is prevented from becoming unseated.

A plurality of circumferentially spaced apart depressions 23 forming radially extending wall sections through each of which a securing bolt 24 extends, are provided in the disk 13 adjacent the rim seating flange 21. The securing bolts are preferably rigidly connected to the depressed portions 23 and are provided with an outwardly extending threaded portion adapted to receive securing nuts as hereinafter described. While it is preferred to form the seat for the securing bolts 24 by providing the depressions 23, the disk itself, if desired, may be suitably formed to provide the necessary radially extending wall for the reception of the bolts 24. An annular shoulder or bead 25 is formed in the disk 13 immediately adjacent the depressions 23.

The rim 14 is held in position upon the flange 21 and is supported at one side by a plurality of clamps 26 preferably secured to the periphery of the cover plate 15. A plurality of circumferentially spaced apart openings are formed in the plate adjacent its periphery through which the free extremity of the securing bolts 24 extend. The edge of the plate 15 about these openings is flanged as indicated at 27 whereby the clamps 26 are loosely connected thereto. The clamps 26 are formed with a shoulder portion at their upper extremity adapted to contact and securely engage the forward edge of the base of the rim 14 and at their lower extremity with a shoulder adapted to contact the shoulder 25 formed in the disk 13. Suitable securing nuts 28 are threaded on to the free outer extremity of the securing bolts 24. The cover plate is held in position by the nuts 28 and when these nuts are tightened the clamps are forced into position against the shoulders 25 and the edge of the rim 14 whereby the forward edge of the rim is supported and the same is securely fixed upon the seat 21.

The cover plate 15 is attached to the wheel only at its periphery by means of the securing bolts 24 and nuts 28. The plate and clamps 26 attached thereto may be separated from the wheel by removing the nuts 28. When the nuts have been removed the rim is freed so that it may be readily dismounted.

By reason of the fact that the cover plate 15, in the preferred embodiment, through the clamps 26, contacts and supports the rim at spaced intervals about its circumference, there is less strain on the rim supporting disk 13. Accordingly, both the disk and the cover plate may be formed of relatively light metal without weakening the wheel as a whole. The cover plate and disk are disposed in spaced relation to each other, as shown, whereby a strong box-like wheel body is formed. In this manner an inexpensive wheel is provided which is of light weight but of rigid construction.

The form of wheel shown in Figure II consists of a hub 11, a wheel body or rim supporting disk 29 attached to a hub flange 30, a rim 14 seated upon the periphery of the disk, and a removable cover plate 15 attached to the disk whereby to hold the rim 14 in position.

The central portion of the disk 29 is convexly curved in an opposite direction to that of the central portion of the cover plate 15. The disk is preferably removably secured to the hub flange 30 by means of the securing bolts 31 and the nuts 32, although any other suitable securing means may be utilized if desired. The peripheral portion of the disk 29 is formed identical to the corresponding portion of the disk 13. The cover plate 15 is secured to the disk 29 in the same manner and by the same means as the plate shown in Figure I is secured to the disk 13.

A brake drum web 33 is also attached to the hub flange 30 by any suitable means which may be the bolts 31 and nuts 32 if desired. The web 33 is attached, as by welding, at its periphery to a brake ring 34. The brake ring is preferably provided with an inner wear resisting liner 35.

While for the purpose of illustration the invention has been shown and described as including detachable cover plate associated with a conventional wheel disk and a demountable rim, it should be understood that the detachable cover plate may also be used with any of the other conventional wheel types, including those embodying a fixed tire supporting rim. Where the detachable cover plate is utilized in combination with a wheel embodying a fixed rim, the periphery of the cover plate may be removably attached either to the rim or to the conventional wheel body. In either case the central portion of the cover plate will be spaced from the conventional wheel body whereby to form a box-like construction therewith.

From the foregoing description it will be apparent that this invention provides a novel vehicle wheel embodying a cover plate adapted, if desired, to be secured to a wheel body by the same means utilized for securing the rim retaining and supporting clamps in position. The cover plate not only enhances the appearance of the wheel but adds rigidity thereto, and may also serve to support one side of a demountable rim.

While only the preferred forms of the invention have been shown and described, it should be understood that the invention is not limited thereto but is coextensive with the scope of the appended claims:

I claim:

1. A vehicle wheel including in combination a hub, a radially extending wheel body attached to the hub, said wheel body having a peripheral portion adapted to support a demountable rim, a demountable rim seated upon said peripheral portion, a cover plate, clamping means adapted to engage the demountable rim loosely connected to the periphery of the cover plate, and means for securing said clamping means to the wheel body adjacent its periphery whereby to lock the demountable rim in position upon the wheel body.

2. A vehicle wheel including in combination a hub, a wheel body attached to the hub, a demountable rim seated upon the periphery of the wheel body, a cover plate, a plurality of clamping devices loosely connected to the periphery of the cover plate, and means for securing the said clamps against the wheel body and the demountable rim whereby to lock the latter in position upon the wheel body.

3. A vehicle wheel including in combination: a pair of oppositely dished disks having corresponding radially extending peripheral portions, one of said disks having an axially extending peripheral flange forming a rim seat, a rim mounted upon said seat, a plurality of bolts rigidly connected to the radially extending peripheral portion of one of said disks, a plurality of rim clamps loosely connected to the radially extending peripheral portion of the other disk, and means for fastening said clamps upon said bolts between said disks whereby to lock the rim in position upon its seat.

4. A vehicle wheel including in combination: a hub, a main supporting disk connected centrally to the hub and having a rim seated upon its periphery, an auxiliary disk spaced centrally from the hub and main supporting disk, a plurality of rim clamps loosely connected to the periphery of said auxiliary disk, said rim and main supporting disk having seats for said clamps, and means for fastening said clamps in position against said seats whereby to lock the rim in position.

5. A structure as set forth in claim 3, in which one of the disks and the clamps are provided with flanges which interlock in a manner to loosely connect the clamps to said disk.

6. A structure as set forth in claim 4, in which the auxiliary disk and the clamps are provided with interlocking flanges of a character to loosely connect the clamps to the disk in a manner whereby the clamps may adjust themselves in a position against said seats and lock the rim in position when the disks are brought together.

7. A vehicle wheel including in combination: a pair of oppositely dished disks having corresponding radially extending peripheral portions, one of said disks having an axially extending peripheral flange forming a rim seat, a rim mounted upon said seat, a plurality of bolts connected to the radially extending peripheral portion of one of said disks, a plurality of openings formed in the radially extending peripheral portion of the other disk, the edges forming said openings being flared, a plurality of rim clamps provided with means for receiving the said flared edges of said openings in a manner to loosely connect the clamps to said last mentioned peripheral portion, and said bolts extending through said disks and through said clamps for fastening said disks together whereby said clamps will lock said rim in position upon its seat.

8. A vehicle wheel including in combination a wheel body, a demountable rim seated upon the periphery of the wheel body, a cover plate, a plurality of clamping devices loosely connected to the periphery of the cover plate, and means for securing the said clamps against the wheel body and the demountable rim whereby to lock the latter in position upon the wheel body.

9. A cover plate for vehicle wheels comprising a disk having a plurality of circumferentially spaced openings formed therein adjacent its periphery, the edges of the disk about each of said openings being flanged to loosely connect thereto a rim clamping device.

10. A cover plate for vehicle wheels comprising a disk having a plurality of rim clamping devices loosely connected to the periphery thereof.

11. A vehicle wheel including in combination a wheel body having a rim seat, a rim mounted on the seat, a cover plate, a plurality of rim clamping devices loosely connected to the periphery of the cover plate, and means for securing the cover plate to the wheel body with the clamping devices between the two.

12. A vehicle wheel including in combination a wheel body having a rim seat, a rim mounted on the seat, a cover having a rim clamp loosely connected thereto adjacent its periphery, and means cooperating with said clamp for securing the cover to the wheel and holding the rim in position on its seat.

J HAROLD HUNT.